(12) United States Patent
Green et al.

(10) Patent No.: US 7,304,012 B2
(45) Date of Patent: Dec. 4, 2007

(54) CATALYST

(76) Inventors: Malcolm Leslie Hodder Green, Inorganic Chemistry Laboratory, South Parks Road, Oxford (GB) OX1 3QR; Tiancun Xiao, Inorganic Chemistry Laboratory, South Parks Road, Oxford (GB) OX1 3QR (*) Notice: Subject to any disclaimer, the term of this patent is extended or adjusted under 35 U.S.C. 154(b) by 281 days.

(21) Appl. No.: 10/519,170

(22) PCT Filed: Jun. 20, 2003

(86) PCT No.: PCT/GB03/02701

§ 371 (c)(1),
(2), (4) Date: Dec. 20, 2004

(87) PCT Pub. No.: WO04/000456

PCT Pub. Date: Dec. 31, 2003

(65) Prior Publication Data

US 2005/0250863 A1    Nov. 10, 2005

(30) Foreign Application Priority Data

Jun. 21, 2002  (GB) .................................. 0214383.2

(51) Int. Cl.
B01J 21/18  (2006.01)
B01J 23/40  (2006.01)
B01J 23/00  (2006.01)
C07C 27/00  (2006.01)

(52) U.S. Cl. ............ 502/180; 502/182; 502/184; 502/185; 502/305; 502/311; 502/312; 502/313; 502/303; 502/304; 502/324; 502/325; 518/700

(58) Field of Classification Search ........ 502/305–355, 502/180, 182, 184, 185, 303, 304; 518/700
See application file for complete search history.

(56) References Cited

U.S. PATENT DOCUMENTS

| | | | |
|---|---|---|---|
| 2,230,267 A | 2/1941 | Ruben | |
| 3,787,332 A * | 1/1974 | Sugier | 502/178 |
| 3,853,791 A * | 12/1974 | Feins | 502/314 |
| 4,113,658 A | 9/1978 | Geus | |
| 4,469,815 A * | 9/1984 | Sambrook et al. | 502/303 |
| 4,522,940 A * | 6/1985 | Sambrook et al. | 502/328 |
| 4,559,365 A * | 12/1985 | Wachs et al. | 518/717 |
| 4,608,359 A * | 8/1986 | Wachs et al. | 502/177 |
| 4,874,733 A | 10/1989 | Miller et al. | |
| 5,672,558 A * | 9/1997 | White et al. | 502/349 |
| 6,025,296 A | 2/2000 | Takemoto et al. | |
| 6,278,034 B1 | 8/2001 | Espinoza et al. | |
| 6,656,978 B2 * | 12/2003 | Shiroto et al. | 518/715 |

FOREIGN PATENT DOCUMENTS

| | | |
|---|---|---|
| CN | 1058546 A1 | 2/1992 |
| EP | 0109702 A1 | 5/1984 |
| EP | 0127220 A2 | 12/1984 |
| EP | 0153781 A2 | 9/1985 |
| EP | 0167215 A2 | 1/1986 |
| EP | 0398420 A2 | 11/1990 |
| EP | 0421502 A2 | 4/1991 |
| EP | 0510771 A1 | 10/1992 |
| EP | 0527032 A1 | 2/1993 |
| WO | WO-98/47618 A1 | 10/1998 |

OTHER PUBLICATIONS

Great Britain Search Report for Application No. GB 0214383.2, dated Feb. 26, 2003.

* cited by examiner

*Primary Examiner*—J. A. Lorengo
*Assistant Examiner*—Patricia L. Hailey
(74) *Attorney, Agent, or Firm*—Lahive & Cockfield, LLP; Giulio A. DeConti, Jr.; Danielle L. Herritt

(57) ABSTRACT

A process for preparing a supported catalyst or catalyst precursor containing carbon, said process comprising: a. preparing a liquid mixture of (i) at least one catalyst support or catalyst support precursor; (ii) at least one metal-containing compound, wherein said metal is selected from V, Cr, Mn, Fe, Co, Ni, Cu, Mo and W, and (iii) at least one polar organic compound which acts as a solvent for the metal-containing compound, said liquid mixture comprising 0 to 20 wt % of water based on the total weight of the mixture; b. converting said mixture to a paste or solid residue; and c. combusting the residue in an oxygen-containing atmosphere to at least partially convert the organic compound to carbon and to form said supported catalyst or catalyst precursor.

28 Claims, No Drawings

CATALYST

RELATED APPLICATIONS

This application is a National Stage of International Application No. PCT/GB2003/002701, filed Jun. 20, 2003, which claims the benefit of Great Britain Application No. 0214383.2, filed Jun. 21, 2002.

The present invention relates to a process for preparing a supported catalyst or catalyst precursor, to a process for carrying out a chemical reaction utilizing such a catalyst, and to Fischer-Tropsch synthesis and steam reforming catalysts.

BACKGROUND

Catalysts are well known to be useful in certain reactions. In particular, they can be used to promote particular reactions that would not normally take place in the absence of the catalyst.

A typical catalyst comprises one or more catalytically active components supported on a catalyst support. Typically, the catalytically active components are metals and/or metal-containing compounds. The support materials are generally high surface area materials with specific pore volumes and distribution.

Various methods for depositing catalytically active components on catalyst supports are known. For example, the catalyst support may be impregnated with an aqueous solution of the catalytically active component(s). The impregnated support may then be dried, and calcined. An example of such an impregnation technique is described in WO 01/96017.

The catalytically active component may also be deposited onto the catalyst support by precipitation. In EP 0569624, for example, a catalyst support is first impregnated in an aqueous solution of a noble metal. The metal is then precipitated onto the support by contacting the impregnated support with an aqueous solution of an alkali metal salt.

A further method of depositing a catalytically active component on a catalyst support is the sol-gel method. In the sol-gel method, a metal compound or oxide is hydrolysed in the presence of a stabiliser, such as an amphiphilic betaine, to produce colloidal particles of the metal oxide. The particles may be co-precipitated onto a support formed of gel precursors of, for example, hydrolysed $Si(OMe)_4$. An example of such a process is described in DE 19852547.

SUMMARY OF THE INVENTION

A new process for producing a catalyst has now been developed. In particular, the process of the present invention enables a catalytically active component(s) or its precursor(s) to be deposited on a support in a controlled manner. Accordingly, certain properties of the catalyst, for example its activity and/or selectivity, may be controlled.

According to a first aspect of the present invention, there is provided a process for preparing a supported catalyst or catalyst precursor containing carbon, said process comprising:
 a. preparing a liquid mixture of (i) at least one catalyst support or catalyst support precursor; (ii) at least one metal-containing compound, wherein said metal is selected from V, Cr, Mn, Fe, Co, Ni, Cu, Mo and W, and (iii) at least one polar organic compound which acts as a solvent for the metal-containing compound, said liquid mixture comprising 0 to 20 wt % of water based on the total weight of the mixture;
 b. converting said mixture to a paste or solid residue; and
 c. combusting the residue in an oxygen-containing atmosphere to at least partially convert the organic compound to carbon and to form said supported catalyst or catalyst precursor.

According to a second aspect of the present invention, there is provided a process for preparing a supported catalyst or catalyst precursor containing carbon, said process comprising:
 a. preparing a mixture of (i) at least one porous catalyst support and (ii) at least one organic compound in a solvent, said mixture comprising 0 to 20 wt % of water based on the total weight of the mixture;
 b. removing the solvent such that the organic compound is deposited in the pores of the catalyst support;
 c. mixing the catalyst support with a solution of at least one metal-containing compound and removing the solvent to form a solid residue or kneading or mechanical mixing the catalyst support with at least one metal-containing compound, wherein said metal is selected from V, Cr, Mn, Fe, Co, Ni, Cu, Mo and W; and
 d. combusting the resultant solid in an oxygen-containing atmosphere to at least partially convert the organic compound to carbon and to form said supported catalyst or catalyst precursor.

The present invention also provides a process for carrying out a Fischer-Tropsch synthesis, hydrotreating, hydrocarbon partial oxidation, steam reforming or carbon dioxide reforming reaction, which comprises catalysing said reaction with a catalyst prepared by a process as defined above.

The present invention additionally provides a Fischer-Tropsch synthesis catalyst or catalyst precursor comprising, on an inert support,
 i) 10 to 40 wt % cobalt, nickel or a mixture thereof;
 ii) 1 to 10 wt % of at least one promoter selected from zirconium, uranium, titanium, thorium, hafnium, cerium, lanthanum, yttrium, magnesium, calcium, strontium, cesium, rubidium, molybdenum, tungsten, chromium, manganese and rare earth elements; and
 iii) carbon in an amount of up to 8 wt %; the above percentages being based on the total weight of the supported catalyst.

The present invention further provides a steam reforming catalyst or catalyst precursor comprising, on an inert support,
 i) 0.1 to 30 wt. % cobalt, nickel or a mixture thereof;
 ii) 0 to 10 wt. % of at least one promoter selected from sodium, potassium, uranium, titanium, thorium, hafnium, cerium, lanthanum, yttrium, magnesium, calcium, strontium, cesium, rubidium, molybdenum, tungsten, chromium, manganese and rare earth elements; and
 iii) carbon in an amount of up to 4 wt. %;

the above percentages being based on the total weight of the supported catalyst.

The catalyst or catalyst precursor may be non-activated or activated, for example by hydrogen or hydrocarbon gas or vapour.

DETAILED DESCRIPTION OF THE INVENTION

Catalysts and catalyst precursors produced by the processes of the present invention may be employed in a number of reactions. For example, the catalysts and catalyst precursors produced by the processes of the present invention may be used in Fischer-Tropsch synthesis, in a hydrotreating reaction or to catalyse the partial oxidation of a hydrocarbon, such as methane (POM). It may also, for example, be used in a steam reforming, carbon dioxide reforming or methane reforming reaction such as a dry or wet reforming reaction.

As used herein, the term "catalyst" covers the catalyst in active form. The term "catalyst precursor" covers the catalyst in precursor form, since it may undergo change in the reaction environment.

The first aspect of the invention will now be further described.

In step a), a liquid mixture is prepared from at least three components: (i) a catalyst support or a catalyst support precursor; (ii) one or more metal-containing compound(s) and (iii) one of more polar organic compound solvents which act as solvent(s) for the metal-containing compound(s), optionally together with water.

All three components may be mixed together simultaneously. The components may be mixed together at room or elevated temperature, for example, at 20 to 200° C., preferably 40 to 80° C., more preferably 40 to 60° C.

In an alternative embodiment, two of the three components may be mixed together in a preliminary step, before the third component is added to complete the liquid mixture. Preferably, components (ii) and (iii) are mixed together in a preliminary step. These two components may form a clear solution. Thereafter, component (i) may be added to complete the liquid mixture—which will contain solid particles if component (i) is a solid support. The liquid mixture may be formed at elevated temperature, for example, at 20 to 200° C., preferably 30 to 80° C.

As mentioned above, component (i) is a catalyst support or catalyst support precursor. A catalyst support is generally in the form of one or more solid particles. In contrast, the catalyst support precursor may initially be in liquid form or in the form of a solution. The support precursor may form a solid catalyst support in situ, for example, once the catalyst support precursor has been added to the liquid mixture. In a preferred embodiment, the catalyst support precursor forms a catalyst support in the conversion or combustion step (steps b or c).

Suitable catalyst supports include inert supports or active supports.

Examples of suitable supports include solid oxides, carbides, zeolites, carbon and boronitride, especially alumina, modified alumina, spinel oxides, silica, modified silica, magnesia, titania, zirconia, a molecular sieve, a zeolite, β-aluminate and forms of carbon. The alumina or modified alumina may be, for example, α-alumina, β-alumina or γ-alumina. β-alumina and spinel oxides such as barium hexaaluminate have been found to be particularly useful in view of their stability. The carbon may be in the form, for example, of active carbon or carbon nanotubes. A zeolite may be chosen depending on the desired final product. Thus, for example, it may comprise pores or channels. Suitable zeolites are zeolites A, X, Y, ZSMs, MCMs or $AlPO_4$.

Suitable catalyst support precursors may be derived from $Al(NO_3)_3 \cdot 9H_2O$ or $Mg(NO_3)_2$. Suitable catalyst precursors are described in further detail in Gonzales et al, Catalysis Today, 35 (1997), 293-317 and J. Livage, Catalysis Today, 41 (1998), 3-19.

In one embodiment of the invention, the catalyst support is derived from a nitrate of, for example, a Group IIA or Group IIIA metal. For example, aluminium or magnesium nitrate may be used. Preferably, the nitrate is in hydrated form. Examples of such nitrates are $Al(NO_3)_3 \cdot 9H_2O$ and $Mg(NO_3)_2 \cdot 6H_2O$. In step a, this nitrate may be mixed with an organic compound, such as urea and/or ammonium citrate, to form a clear solution. Water may optionally be added. To complete the liquid mixture, a metal-containing compound, such as cobalt nitrate, is included in the mixture. During one of the subsequent conversion and combustion steps (steps b and c), a supported catalyst or supported catalyst precursor is formed.

The catalyst support employed in the first aspect of the invention is preferably porous. The particle size is desirably 0.1 μm to 20 mm, preferably, 0.2 μm to 5 mm, depending on the application. The surface area is desirably greater than 5 $m^2/g$, preferably greater than 10 $m^2/g$, more preferably greater than 50 $m^2/g$, for example, greater than 200 $m^2/g$. One or a mixture of two or more catalyst supports may be used.

Component (ii) of the liquid mixture is a metal-containing compound. One or more metal containing compounds may be used. Generally, the catalytically active component of the catalyst is, or is derived from, this metal-containing compound. Suitable metal-containing compounds are well known in the art. The metal in the metal containing compound is V, Cr, Mn, Fe, Co, Ni, Cu, Mo or W. One or more of such metals may be used. It is also possible to incorporate a further metal, for example to act as a promoter or modifier such as, for example, at least one of Zr, U, Ti, Th, Hf, Ce, La, Y, Mg, Ca, Sr, Cs, Rb, Mo, W, Cr, Mg, rare earth metals and noble metals. For example, the metal-containing compound may comprise at least one of V, Cr, Mn, Fe, Co, Ni, Cu, Mo or W and at least one metal selected from the lanthanide, actinide and transition metal series of the Periodic Table. Preferably, the additional metal is selected from an f-block or d-block metal.

Preferred additional metals are one or more selected from noble metals such as Pd, Pt, Rh, Ru, Ir, Au, Ag and Os, and transition metal elements such as Ti, V, Cr, Mn, Fe, Co, Ni, Cu, Zn, Zr, Nb, Mo, Tc, Cd, Hf, Ta, W, Re, Hg, Tl and the 4f-block lanthanides such as La, Ce, Pr, Nd, Pm, Sm, Eu, Gd, Tb, Dy, Ho, Er, Tm, Yb and Lu. Of these metals, Pd, Pt, Ru, Ni, Co, Fe, Cu, Mn, Mo and W are preferred.

The metal-containing compound may contain other elements, although one skilled in the art will recognise that an appropriate choice may have to be made depending on the final use of the catalyst and the preparation conditions. Preferably the metal-containing compound is in the form of a salt. Examples of suitable metal-containing salts are nitrates, citrates, halides, alkoxides, phenoxides, acetates, benzoates, oxalates and acetylacetonates Component (iii) of the liquid mixture is a polar organic compound. The organic compound functions as a solvent for component (ii) and may act as a solvent for compound (i). The organic compound may be any polar organic compound that is capable of undergoing combustion in the presence of an oxygen-containing atmosphere such as air. A distinguishing feature of combustion is that a flame can often be seen during the combustion. It is a necessary feature of the combustion that the organic compound is converted to carbon which may be present either as elemental carbon or as a carbide, for example a carbide of the metal of the metal-containing compound (ii). Some or all of the organic compound may be converted to carbon, and it is also possible for some of the organic compound to be completely combusted such that the carbon is converted to carbon monoxide or carbon dioxide and is removed from the catalyst or catalyst precursor as a gas. Preferably, the organic compound is one that does not produce an ash, in particular an oxide ash, after the combustion step. Preferably, therefore, the organic compound is one that does not contain elements that have a tendency to form involatile residues such as oxides after combustion. Such elements include, for example, metals, phosphorus and/or silicon.

Examples of suitable organic compounds are organic amines, organic carboxylic acids and salts thereof such as ammonium salts, alcohols, ammonium salts of phenoxides and alkoxides, amino acids and surfactants. Preferred alcohols are those containing from 1 to 30 carbon atoms, preferably, 1 to 15 carbon atoms. Examples of suitable alcohols include methanol, ethanol and glycol. A preferred carboxylic acid is citric acid or oxalic acid. Other preferred organic compounds are compounds containing functional groups such as one or more hydroxyl, amine, amide, carboxylic acid, ester, aldehyde, ketone, imine or imide groups. Suitable compounds include urea, hydroamines, trimethylamine, triethylamine, tetra methylamine chloride and tetraethylamine chloride. Preferred organic compounds include EDTA, urea and/or ammonium citrate The organic compound may be in the form of a liquid at room temperature (20° C.) or at the temperature at which the mixture is prepared. The organic compound may be heated before it is added to the mixture. The organic compound may also be in the form of a solid at room temperature or at the temperature at which the mixture is prepared, in which case the mixture is heated after it is prepared to melt the organic compound and then dissolve the metal compound. Mixtures of organic compounds can be used. Water may also be added, for example to assist the dissolution of the metal compound(s).

When water is employed in the liquid mixture, the amount of water may need to be controlled. For example, certain catalyst support precursors, such as $Fe(NO_3)_3 \cdot 9H_2O$ and $Al(NO_3)_3 \cdot 9H_2O$ have a tendency to form polymeric gels on coming into contact with effective amounts of water. Thus, the amount of water employed in step (a) is preferably kept to a minimum, to avoid the formation of a hydrolysed gel. Thus, the amount of water may be sufficient to partially hydrolyse the catalyst precursor, but not sufficient to convert the catalyst precursor into a polymer. Typically up to 20 wt % water can be used with respect to the total weight of the mixture. In other embodiments of the invention, the use of water is avoided altogether.

Water may be added separately or may, for example, be present in one of the components added as water of crystallisation or water of coordination.

The mixture may also comprise other components if desired. Other components that may be added to the liquid mixture include promoters and/or modifiers. Suitable promoters are alkaline earth salts such as magnesium, calcium, barium and/or strontium nitrate. Suitable modifiers are rare earth modifiers such as rare earth salts, for example lanthanum and/or cerium nitrate or acetate, or oxides of the d-block transition metals. Examples are oxides of phosphorus, boron, gallium, germanium, arsenic and antimony. The promoters and modifiers may be used singly or in a combination of two or more.

It is important that the mixture prepared in step (a) is a liquid mixture. By "liquid mixture", we mean that the mixture is in the form of a homogeneous liquid, although it may comprise solid particles. For example, after the homogeneous liquid mixture of the organic compounds, optionally water, and metal compounds, has been formed, insoluble particles of the inert support may be added. For instance, if a catalyst support rather than a catalyst support precursor is present, the liquid will usually comprise solid support particles. It is an essential aspect of the present invention that the metal-containing compound is able to contact the support or support precursor, and this is achieved by the use of a liquid mixture.

The weight ratio of component (i): (ii): (iii) employed in step a is preferably 0.1-80:1-90:1-99, more preferably 0.5-60:2-80:10-90. It should be understood that the weight ratios may be varied depending on the intended use of the final catalyst. The amount of organic compound is generally determined by the atomic ratio of carbon in the organic compound to metal (C:M) in the dissolved metal containing compound. Normally the atomic ratio is at least 0.4:1, preferably 1 to 20:1.

After the liquid mixture is formed, it is converted to a paste or solid residue in step b. Desirably, this is achieved by heating the mixture. This heating step is in addition to any heating required to melt the organic compound, although if previous heating is required that heating can simply be continued in step b. The heating transforms the liquid mixture into a solid, for example by evaporating or decomposing the organic solvent. Any water that may be present in the liquid mixture is also preferably evaporated. The temperature to which the mixture is heated may be any temperature above room temperature (20° C.), for example from 50° C. to 250° C., and can be carried out for any time until a solid residue is formed, for example for from 1 to 24 hours. A combination of drying steps may be used.

Thus, for example, the mixture may initially be dried at room temperature for from 2 to 10 hours, and subsequently dried at an elevated temperature, for example from 100° C. to 200° C., especially about 120° C.

In step c the mixture is combusted. Preferably, the combustion step is carried out in air. Alternatively, pure oxygen or oxygen in an inert atmosphere of, for example, nitrogen or another inert gas may be employed. This combustion step may be separate from the heating in step b, or the two steps may be combined, for example by simply continuing to heat the mixture after the solvent has been removed.

A suitable combustion temperature is, for example, from 200° C. to 1000° C., especially from 400° C. to 600° C. The combustion step may be performed for any time, but especially for a limited duration such as 60 minutes or less, preferably 30 minutes or less, more preferably 15 minutes or less, especially for from 5 to 15 minutes. As indicated above, the combustion step converts the polar organic compound into carbon and volatiles. It is also postulated, although we are not bound by this theory, that the combustion step completely or partially changes the metal-containing compound into a metal and/or one or more oxide, oxycarbide or carbide forms or mixtures thereof. The combustion step may also convert the promoter and/or modifier to oxide forms if they are present.

The catalyst preparation may, for example, proceed by first mixing the metal containing compound(s) and polar organic compound(s). This mixture is usually viscous and addition to a solid catalyst support will mainly coat the external surface of the support, with only a limited penetration of "internal" surfaces such as pores. After the combustion step, a so-called "egg-shell" catalyst in which all or substantially all of the catalyst is present on the surface of the support is obtained. Such a catalyst is useful for many reactions, in particular a Fischer-Tropsch synthesis reaction. We have surprisingly found that the process of the present invention provides a better and more even distribution of the catalyst on the surface of the support than when only water is used as the solvent.

The catalyst preparation may also, for example, proceed by first mixing the metal containing compound(s) with the organic compound(s) and a soluble support precursor then added. After combustion, the metal catalyst will be distributed on both the "external" and "internal" surfaces of the support. This catalyst can be used advantageously for partial oxidation of natural gas to synthesis gas and partial oxidation of gasoline into hydrogen. A more homogeneous distribution of the catalyst throughout the support may be obtained than in known catalysts.

The supported catalyst or catalyst precursor generally comprises from 0.5 to 50 wt % catalyst or catalyst precursor, 0 to 10 wt % promoter and 0 to 5 wt % modifier, based on the total weight of the supported catalyst or catalyst precursor. For a POM reaction the supported catalyst or catalyst precursor preferably comprises from 0.5 to 10 wt % catalyst or catalyst precursor, 0 to 5 wt % promoter and 0 to 3 wt % modifier. For a Fischer-Tropsch reaction the supported catalyst or catalyst precursor preferably comprises from 5 to 40 wt % catalyst or catalyst precursor, 0 to 3 wt % promoter and 0 to 3 wt % modifier. The above percentages for the catalyst or catalyst precursor are based either on the compound or the metal in the compound.

The supported catalyst precursor may, if desired, be activated, for example with hydrogen or hydrocarbon gas or vapour.

The second aspect of the invention will now be further described.

This aspect of the invention differs from the first aspect in that the initial mixture only necessarily comprises a porous catalyst support and a polar organic compound in a solvent. The metal-containing compound is not necessarily present. In this aspect of the invention the solvent is removed, for example by heating, such that the organic compound is deposited in the pores of the catalyst support. The catalyst support is then mixed with the metal-containing compound, especially in the form of a solution wherein the solvent is subsequently removed to form a solid residue. Alternatively, the catalyst support is kneaded with metal-containing compound. This process produces a supported catalyst or catalyst precursor in which the catalyst or catalyst precursor is predominantly situated on the external surfaces of the porous particles. Such a catalyst is particularly useful as a catalyst for Fischer-Tropsch synthesis.

For the most part, the discussion concerning the first aspect of the invention is also appropriate for the second aspect, in particular in regard to the porous catalyst support, the metal-containing compound and the additional metals. Accordingly the discussion regarding the first aspect also applies to the second aspect and is herein incorporated by reference. In step a of the second aspect of the present invention, however, the solvent in which the organic compound is dissolved may not only be a polar organic solvent, for example, one of those listed in respect of the first aspect of the present invention, but may also be a non-polar organic solvent or water. The organic compound should, however, be solid at room temperature (20° C.) so that it effectively blocks the pores of the catalyst support when the solvent is removed.

As mentioned above, a solution of the metal-containing compound is employed in step c of the second aspect of the present invention. The metal-containing compound may be dissolved in any solvent, for example, a polar organic solvent such as those mentioned with respect to the first aspect of the present invention, a non-polar organic solvent or water. The solvent can again be removed by any means, for example by heating. If the catalyst support is kneaded with a metal-containing compound, the metal-containing compound is preferably solid at room temperature. The kneading may be carried out for a suitable time such that the surfaces of the support is coated with the metal-containing compound, for example for 1 hour or greater.

The process of the present invention provides a catalyst or catalyst precursor supported on the support. Depending on the nature of the reaction to be catalysed, the catalyst precursor may be distributed in any desired way on the "external" surface or in the "internal" surfaces of the support. Thus it may, for example, be distributed substantially throughout the support or only on the external surface of the support. By appropriate choice of starting materials and process conditions, it has been found that the distribution of the active catalyst component or precursor thereof can be carefully controlled.

The catalyst or catalyst precursor contains carbon in all of its possible forms. For example it may be present as elemental carbon or in the form of a metal carbide or oxycarbide. The carbon content is especially up to 8 wt % based on the total weight of the catalyst precursor or catalyst but is preferably from 0.01 to 2 wt % for better performance.

The catalyst or catalyst precursor produced by the process of the present invention may be used in any process where a catalyst may be used, especially when a fixed bed reactor is used. Thus, for example, it may be used in a POM reaction, Fischer-Tropsch reaction, or a hydrotreating reaction, for example a hydroisomerisation reaction, a hydrogenation reaction, a steam reforming reaction (wet reforming), a carbon dioxide reforming (dry reforming) or a methane reforming reaction.

In a POM reaction, a mixture of a hydrocarbon and oxygen is passed over the catalyst to produce syngas. The hydrocarbon preferably contains from 1 to 16 carbon atoms and more preferably from 1 to 5 carbon atoms. Most preferably it is methane or natural gas. The hydrocarbon may be saturated or unsaturated, for example containing from 1, 2, 3 or more double and/or triple bonds. It may be linear, cyclic or branched. The hydrocarbon may also be aliphatic and aryl or contain both aliphatic and aryl groups. One or a mixture of hydrocarbons may be used.

In the POM reaction the oxidant is normally $O_2$. However, it may be supplemented with $H_2O$ (steam) or $CO_2$, for example by addition to the feedstock. Thus $O_2$ and $H_2O$; $O_2$ and $CO_2$; or $O_2$, $H_2O$ and $CO_2$ may be used. This results in oxy-steam or oxy-dry reforming of methane, respectively. By this means the exothermicity and product ratio may be controlled as desired. The $O_2$, and optionally $H_2O$ and $CO_2$ may be used pure or diluted with an inert gas such as air, $N_2$, Ar or He.

Desirably the reaction takes place at a temperature of at least 500° C., for example from 700° C. to 1000° C. Desirably the pressure is atmospheric pressure (101 kPa) or above, for example from 1 to 30 atmospheres (101 kPa to 3040 kPa). The mole ratio of the hydrocarbon being oxidized and the oxygen is desirably chosen such that a mixture of carbon monoxide and hydrogen is obtained in a stoichiometric ratio. Thus, for example, the atomic ratio of carbon in the hydrocarbon such as methane to oxygen is desirably 1.8 to 3.5:1, especially about 2:1, although lower or higher ratios may also, if desired, be used.

The catalyst produced by the process of the present invention may also be used, for example, in a Fischer Tropsch synthesis reaction. Such a reaction produces a mixture of hydrocarbons and/or oxygenated hydrocarbons, for example gaseous, liquid and/or solid hydrocarbons and/ or oxygenated hydrocarbons such as alcohols, from a mixture of hydrogen and carbon monoxide. Thus, for example, the reaction can be carried out immediately using syngas prepared by the POM method in directly linked reactors as disclosed in, for example, WO 01/36,323.

In a Fischer-Tropsch reactor, the conversion of the $H_2/CO$ mixture into hydrocarbon is preferably carried out at a temperature of 125 to 350° C., in particular at 175 to 275° C., and a pressure of 1 to 200 bar, in particular 10 to 75 bar, The Fischer-Tropsch catalysts can be used in both fixed-bed and slurry reactors. In an initial activation step, the catalyst is first activated, for example with $H_2$ or $H_2/CH_4$ mixed with an inert gas at, for example, 0.01-1° C./min to no more than 500° C., preferably from 200 to 400° C. under, for example, ambient atmosphere to 30 bar, and held for a time, for example about 1 hour or more. Then the reactor temperature is adjusted to the reaction temperature.

The syngas mixture, e.g. $H_2/CO$ mixture which is suitable for conversion into hydrocarbons, can be very suitably obtained starting from light hydrocarbons such as methane by means of steam reforming or partial oxidation. Special preference is given to the use of natural gas as feedstock for the preparation of the $H_2/CO$ mixture.

The $H_2/CO$ mixture converted into hydrocarbons preferably has an $H_2/CO$ molar ratio of more than 1, more preferably from 1.5 to 2.5 and in particular from 1.75 to 2.25, before being contacted with the catalyst.

In steam reforming, a hydrocarbon is reacted with water vapor over the catalysts described above. Suitable hydrocarbons are, for example, alkanes, alkenes, alkynes, aromatics, and combinations thereof including fuels such as gasoline, kerosene, and diesel. Preferably, the hydrocarbon is an alkane or a fuel. Preferred alkanes are $C_1$-$C_{10}$ alkanes, such as methane, ethane, propane, butane, and isooctane.

The steam reforming reaction is preferably carried out at more than 400° C., more preferably 400 to 800° C., and still more preferably 500 to 900° C. The reaction can be run over a broad pressure range, for example from sub-ambient to very high pressures. A methane steam reforming reaction runs over the catalyst at, for example 1 bar to 70 bar at a $H_2O/C$ mole ratio of from, for example, 0.2 to 3.

The present invention is now further illustrated in the following Examples.

EXAMPLES

Example 1

Preparation of a Cobalt Fischer-Tropsch Synthesis Catalyst $Co(NO_3)_2.6H_2O$ (16 g) was mixed with $UO(NO_3)_2.2H_2O$ (1.3 g), then urea (14.2 g) was added in a mole ratio of urea to metal of 4:1; and the mixture was heated to 40° C.-80° C. and stirred. Water (3.0 ml) was added to the stirred mixture to fully dissolve the cobalt and uranium nitrates. After stirring for 3 hours at 50° C., the mixture became a homogeneous solution. Then 8 grams of dried γ-alumina (particle size: 250 μm-300 μm) was added and the mixture was stirred to allow the support to evenly contact the solution. The mixture was allowed to stand in air without stirring for 4 hours, and was then transferred to a quartz boat and combusted at 500° C. for 10 minutes. The product was formed as black particles and was used as a precursor for a Fischer-Tropsch catalyst system.

Example 2

Preparation of a Cobalt and Zirconia Fischer-Tropsch Synthesis Catalyst $Co(NO_3)_2.6H_2O$ (17.7 g) was mixed with $ZrO(NO_3)_2.2H_2O$, (1.32 g), urea (15.6 g) was added in a ratio of urea to metal of 4:1, and the resulting mixture was heated to 60° C. and stirred. Water (2.0 ml) was added to the mixture while stirring. The cobalt nitrate and zirconium nitrate dissolved completely after stirring for 3 hours at 60° C. to form a homogeneous solution, and 8.0 grams of dried fused silica (surface area: 605 $m^2/g$; particle size: 250 μm-350 μm) was added to the mixture. The mixture was stirred to allow the support to contact the solution. Afterwards, the mixture was allowed to stand in air at 50° C. for 4 hours. It was then transferred to a quartz boat and combusted at 500° C. for 10 minutes. The resulting black particles have a low density of 0.48 g/ml and were used as the catalyst precursor.

Elemental analysis on the catalyst precursor reveals that besides the Co, Si, Zr and O, the precursor also contains 0.1 wt % carbon. Further experiments show that the carbon content depends on the combustion temperature and atmosphere. Lower temperature combustion in static air leads to a higher carbon content in the precursor, while high temperature combustion in flowing air leads to precursors with lower carbon content or even no carbon deposition.

The catalyst precursor has Co present mainly as $CO_3O_4$. Co metal and/or oxycarbide and/or carbide may also be present. Three separate preparations of the catalyst gave a product with almost identical XRD patterns showing that the method was reproducible.

Example 3

Preparation of a CoMo Hydrotreating Catalyst $Co(NO_3)_2.6H_2O$ (0.9 g) and $(NH_4)_6Mo_7O_{24}.4H_2O$ (1.8 g) were blended with urea (4.5 g) and ammonium citrate (0.5 g). Water (6 ml) was added and the mixture was stirred at 40° C. for 4 hours to give a homogeneous pink "jelly-like" material. Then dried alumina (10.8 g) was added and the mixture was stirred for 2 hours. Heating was applied until the product becomes essentially dry. The mixture was transferred into an open quartz boat and combusted at 500° C. for 10 minutes. The resulting metal oxide material was used as a hydrotreating catalyst precursor.

Example 4

Preparation of a Cobalt Fischer-Tropsch Synthesis Catalyst Precursor

Calcined MCM-41 (180 μm)-350 μm) (2.3 g) was impregnated with 3.2 ml of 2.0 M ammonium citrate and dried at 250° C. for 2 hours. The resulting MCM-41/citrate material was then kneaded with $Co(NO_3)_2.6H_2O$ (5.8 g) for 3 hours until the cobalt nitrate appeared to be evenly mixed with the MCM-materials. The kneaded mixture was transferred to a crucible and combusted at 400° C. in air for 5 minutes to give the precursor of a MCM-41 supported cobalt catalyst for use in a Fischer-Tropsch synthesis.

Example 5

Preparation of a Nickel Catalyst $Ba(NO_3)_2$ (0.5 g) was mixed with $Al(NO_3)_3.9H_2O$, (19.64 g), $Ni(NO_3)_2.6H_2O$ (0.8 g) and urea (6 g). The mixture was heated to 50° C. and blended until a transparent gel was obtained. In case there was still some undissolved material, a little water was added slowly while stirring until all material was dissolved. The resulting gel was transferred to an open crucible and combusted at 600° C. in the air for 20 minutes. A Ba-modified alumina support supported nickel catalyst precursor was thus prepared.

Example 6

Preparation of Catalyst Precursor for CoW Bimetal-Containing Carbides $Co(NO_3)_2.6H_2O$ (3.6 g) was mixed with $(NH_4)_{10}W_{12}O_{41}.2H_2O$ (6.2 g) urea (8.6 g), ammonium citrate (3.2 g) and water (5 ml). The mixture was heated to 65° C. and stirred for 3 hours to form a gel in which the ammonium tungstate was not completely dissolved. This gel was then transferred to a quartz boat and combusted at 500° C. in the air for 1 hour. A CoWOx with surface area of 20 m$^2$/g and uniform Co and W distribution was thus obtained, as shown by Confocal Laser Raman and SEM results.

Example 7

Fischer-Tropsch Synthesis

The catalyst precursor produced in Example 2 was reduced at 1° C./min to 400° C. under flowing $H_2$ (GHSV: 3000 h$^{-1}$), kept at this temperature for 4 hours, cooled down to 180° C. and then used for a Fischer-Tropsch synthesis reaction. The reaction conditions were: 30 bar, GHSV: 1500 h$^{-1}$, $H_2$/CO=2, catalyst loading amount of 10 ml, 18 vol % $N_2$ was contained in the feedstock. The reactor temperature was adjusted to control the CO conversion.

The selectivity to $CO_2$ and $CH_4$ was found to be 0% and 6.2% respectively, while the selectivity to $C_5^+$ is more than 90% under a CO conversion of 67%. The excellent performance of this catalyst is thought to be due to distribution of Co containing particles in a uniform manner and predominately on the outer surface layer of the silica support, as indicated by SEM and TEM data.

When the catalyst was reduced at 1° C./min to 400° C. under flowing 20% $CH_4/H_2$ and kept for 4 hours, cooled to 210° C. and Fischer-Tropsch synthesis carried out at 8 bar, $H_2$/CO=2, GHSV 2000 h$^{-1}$, CO conversion was found to be more than 85% and selectivity to $C_5^+$ more than 85%.

Example 8

The procedure of Example 6 was repeated to prepare three further CoW bimetal-containing carbides, which were compared with a catalyst prepared by a method in which an organic compound was not used. The catalysts were used for methane partial oxidation to syngas. The catalyst preparation details are seen in Table 1. XRD and SEM characterization results show that Catalysts A and B have a more uniform Co and W distribution than comparative catalyst D. After carburisation, phase separation occurs in catalyst D, although some phase separation was also in seen in catalyst B.

TABLE 1

| | Preparation details |
|---|---|
| Catalyst A | calcination of gel of [(0.4)Co(NO$_3$)$_2$•6H$_2$O + (0.6)WO$_3$ + 2Urea (mole ratio)] at 650° C., then carburised with 20% CH$_4$/H$_2$ to 750° C. for 2 hours |
| Catalyst B | calcination of [(0.4)Co(NO$_3$)$_2$•6H$_2$O + (0.6)(NH$_4$)$_{10}$W$_{12}$O$_{41}$•2H$_2$O + 2Urea (mole ratio)] at 650° C., carburised with 20% CH$_4$/H$_2$ to 800° C. for 2 hours |
| Catalyst C | Stir the gel of (0.4)Co(NO$_3$)$_2$•6H$_2$O + (0.6)(NH$_4$)$_{10}$W$_{12}$O$_{41}$•2H$_2$O + 2Urea (mole ratio)] and Al$_2$O$_3$ at 60° C. for 4 hours, calcined the system at 650° C. to get 17% Co$_{0.4}$W$_{0.6}$O$_x$/ Al$_2$O$_3$, then carburised with 20% CH$_4$/H$_2$ to 800° C. for 2 hours |
| Catalyst D | Mixing (0.4)Co(NO$_3$)$_2$•6H$_2$O + (0.6)WO$_3$ and calcined at 700° C. for hours, carburised then carburised with 20% CH$_4$/H$_2$ to 800° C. for 2 hours |

Catalyst D was formed by a mechanical mixture and calcination method following the procedure of CN-A-R79134.

The XRD patterns of catalysts A and B are almost the same, suggesting that the precursors of tungsten have little effect on the structure of the oxides, although the resultant carbides have substantial difference in the structure.

The structure of catalysts A and D were investigated using XRD. The XRD pattern of catalyst C showed no peaks assignable to the bimetal-containing carbides. However, this may be due to their high dispersion. The structure of catalyst A is different from that of catalyst D. The main phase in catalyst A is WC, rather than W$_2$C, and no XRD peaks due to cobalt metal or carbide species were detected, therefore cobalt must be present in a highly dispersed form.

The activity of the catalyst A in the partial oxidation of methane (reactants composition: 2.4CH$_4$+O$_2$(Air)) was measured under the following conditions: 5 bar, 830° C. and GHSV: 30,000 h$^{-1}$. Catalyst A shows higher methane conversion than catalyst B, but the selectivity to H$_2$ and CO for the two catalysts is almost the same. Catalyst A possesses higher activity and selectivity than catalyst D. An activity test of catalyst C (Co and W content: 17 wt %) for methane partial oxidation at 5 bar and 830° C. shows that methane conversion and H$_2$ & CO selectivity closely approach thermodynamic equilibrium values. The catalyst is stable for at least in 7 days, and no carbon deposition is seen in the catalyst bed. This is probably because the presence of tungsten depresses the carbon deposition.

Example 9

The process of Example 3 was repeated to prepare catalysts containing different amounts of Mo and Co, and these catalysts were used in a thiophene hydrodesulfurisation (HDS) process. The results are shown in Table 2.

TABLE 2

| Catalyst | Mo loading wt % | Co loading wt % | Precursor Preparation Method | Pretreatment | Thiophene Conv, % | HDS rate, mmol/s · g |
|---|---|---|---|---|---|---|
| 3-1 | 9.43 | 2.17 | OMXC | Sulfurization | 78.4 | 0.33 |
| 3-2 | 11.47 | 2.09 | OMXC | Sulfurization | 80.1 | 0.34 |
| 3-3 | 7.27 | 2.24 | OMXC | Sulfurization | 60.1 | 0.25 |
| 3-4 | 9.48 | 1.63 | OMXC | Sulfurization | 62.9 | 0.26 |

The amount of Mo and Co was found to have a significant effect on the catalyst performance for thiophene HDS. A decrease in the Mo content and an increase Co content does not improve the catalyst performance. This may be because Mo is the active component, and the Co serves as a promoter for the reaction.

The XRD patterns of catalysts 3-1, 3-2, 3-3 and 3-4 show no peaks due to Co or Mo oxides. This indicates that the Co and Mo oxides are highly dispersed in the alumina support.

Example 10

The activity of Catalyst 3-3 as defined in Example 9 in a thiophene HDS process was compared with that of a catalyst prepared by an impregnation method. The results are shown in Table 3.

TABLE 3

| Catalyst | React. Temp, ° C. | Pretreatment | Thiophene Conv, % | HDS rate, mmol/s · g |
|---|---|---|---|---|
| 3-3 | 350 | Sulfurization | 79.1 | 0.33 |
| 3-3 | 380 | Sulfurization | 79.3 | 0.33 |
| 3-3 | 350 | Carburization | 28.7 | 0.12 |
| 3-3 | 380 | Carburization | 34.0 | 0.14 |
| 3-3-im | 350 | Sulfurization | 15.8 | 0.07 |
| 3-3-im | 380 | Sulfurization | 24.3 | 0.10 |
| 3-3-im | 350 | Carburization | 12.0 | 0.05 |
| 3-3-im | 380 | Carburization | 20.4 | 0.09 |

Catalyst 3-3 has a higher activity than that of catalyst 3-3-im in both the sulfide and carbide form. However, the sulfide catalysts have much higher performance for thiophene conversation than the carbide catalysts.

Catalyst 3-3-im was also characterized with XRD. The catalysts 3-1, 3-2, 3-3 and 3-4 have only the diffraction peaks of the support and Al metal, which is the sample holder, and no Mo oxide diffraction peaks are observed. However, in Catalyst 3-3-im, small peaks due to the diffraction of $MoO_3$ are seen, suggesting that the impregnation method does not give a highly dispersed form of the $MoO_3$ over the alumina support.

The Raman spectra of $Co-Mo-O/Al_2O_3$ catalysts 3-1 and 3-3-im were measured. The intensity of $CoMoO_4$ peak is weaker in catalyst 3-1 than in Catalyst 3-3-im, although the content of Co and Mo are equivalent, indicating that Catalyst 3-1 has higher and more uniform Co and Mo dispersion, which may be the reason for the improved performance in HDS.

Example 11

Lean Steam Reforming and Dry Reforming of Methane Over Supported CoNiLa Catalysts Catalyst Preparation:

Alumina supported multi-metallic catalysts were prepared using the method of the present invention. The catalytic and promoter metal precursors, i.e. 0.808 g $CO(NO_3)_2.6H_2O$, 0.506 g $Ni(NO_3)_2.6H_2O$, 0.02 g $La(NO_3)_2.6H_2O$ and 0.007 g $Ba(NO_3)_2$, were mixed with 0.6 g urea and 0.2 g ammonium citrate, stirred and heated to 40° C. to obtain a uniform solution. Then 1.8 g gamma alumina (Akzo Noble, >2 mm in diameter) was mixed with the multi-metal solution, and placed in air for 2 hours with stirring and heating to 40° C. when it became a paste. The mixture was then transferred to a 600° C. for 10 minutes. A black alumina supported catalyst was obtained.

For comparison catalysts were also prepared using an impregnation method. The catalytic and promoter metal precursors, i.e. 0.808 g $Co(NO_3)_2.6H_2O$, 0.506 g $Ni(NO_3)_2$. $6H_2O$, 0.02 g $La(NO_3)_2.6H_2O$ and 0.007 g $Ba(NO_3)_2$, were mixed with 1.5 ml distilled water, stirred and heated to 40° C. to obtain an aqueous solution. Then 1.8 g gamma alumina (Akzo Noble, >2 mm in diameter) was mixed with aqueous solution, and placed in air for 2 hours with stirring and heating to 40° C. The mixture was then transferred to a 600° C. oven and combusted at 600° C. for 1 hour.

Catalyst Test for Steam Reforming

In the catalyst evaluation, 0.2 g of the catalyst precursor was loaded in a 9 mm (o.d.) quartz reactor, and activated with 15% $CH_4/H_2$ (GHSV: 10,000 $h^{-1}$) at 4K/min to 600° C. for 1 hour. Then a mixture of $1.0CH_4/0.75H_2O$ (steam) (total flow rate: 100 ml/min NST) was passed over the catalyst bed to evaluate the performance of the catalyst: The reaction temperature varied from 400° C. to 900° C. and the pressure was changed from atmospheric pressure to 5 bar. The performances of the catalysts are as follows:

Performance of the alumina supported CoNiLa catalyst using method of the present invention for lean steam reforming of methane

| | Reaction temperature | | | | | | | |
|---|---|---|---|---|---|---|---|---|
| | 450° C. | 500° C. | 550° C. | 600° C. | 650° C. | 700° C. | 750° C. | 900° C. |
| Methane converstion | 15.6% | 19.6% | 27.5% | 31% | 36.8% | 43.6% | 46.7% | 63.8% |

All the data were taken after 80 hours on stream.

Performance of the alumina supported CoNiLa catalyst prepared using impregnation method for lean steam reforming of methane.

|  | Reaction temperature | | | | | | | |
|---|---|---|---|---|---|---|---|---|
|  | 450° C. | 500° C. | 550° C. | 600° C. | 650° C. | 700° C. | 750° C. | 900° C. |
| Methane conversion | 16.2% | 20.3% | 25.5% | 29.7% | 35% | 42.9% | 47.9% | 59.5% |
| Catalyst lifetime (hour) | 28.5 | 20 | 16.4 | 10.3 | 7.5 | 5 | 2 | 1 |

The catalyst bed was blocked after only a short period test. Higher reaction temperatures lead to faster carbon deposition over the catalyst bed.

XRD results show that the crystallite size (15.8 nm) of the catalyst prepared by impregnation is much bigger than the catalyst prepared using the method of the present invention (2.6 nm), and the catalyst has a carbon deposition rate of 10.5 mg/$g_{Ni.co}$.h) under the conditions of 650° C., 1 bar and 1.0CH$_4$/0.6H$_2$O. For the catalyst prepared using the method of the present invention the carbon deposition rate is 0.5 mg/$g_{Ni.co}$.h).

Catalyst Test for CO$_2$ Reforming of Methane 0.2 g of the catalyst precursor was loaded in a 9 mm (o.d) quartz reactor, and activated with 15% CH$_4$/H$_2$ (GHSV:10,000 h$^{-1}$) at 4° C./min to 600° C., and held at 600° C. for 1 hour. Then a mixture of 1.0CH$_4$/1.2CO$_2$ (total flow rate: 86 ml/min) was passed over the catalyst bed to evaluate the performance of the catalyst. The reaction temperature varied from 400° C. to 900° C. and the pressure was atmospheric pressure. The performances of the catalysts are as follows:

Performance of the alumina supported CoNiLa catalyst prepared using method of the present invention and impregnation methods for dry reforming of methane at 800° C. and 1 bar

| Catalyst prepared using | Present Invention | impregnation |
|---|---|---|
| Initial Methane Conversion | 94.6% | 92.1% |
| Catalyst lifetime | 150 hours, still active | 60 hours, the back-pressure rose to 4 bar, and CH$_4$ conversion dropped to 76% |

The invention claimed is:

1. A process for preparing a supported catalyst or catalyst precursor containing carbon, said process comprising:
   a. preparing a liquid mixture of (i) at least one catalyst support or catalyst support precursor; (ii) at least one metal-containing compound, wherein said metal is selected from V, Cr, Mn, Fe, Go, Ni, Cu, Mo and W, and (iii) at least one polar organic compound which acts as a solvent for the metal-containing compound, said liquid mixture comprising 0 to 20 wt % of water based on the total weight of the mixture;
   b. converting said mixture to a paste or solid residue; and
   c. combusting the residue in an oxygen-containing atmosphere to at least partially convert the organic compound to carbon and to form said supported catalyst or catalyst precursor.

2. A process according to claim 1 wherein the polar organic compound is liquid at 20° C.

3. A process according to claim 1 wherein the polar organic compound is solid at 20° C. and the liquid mixture is formed by melting the polar organic compound.

4. A process according to claim 1 in which the liquid mixture comprises a solid catalyst support and the metal-containing compound dissolved in the polar organic compound.

5. A process according to claim 1 wherein the catalyst support precursor is dissolved in said liquid mixture and forms the support during the heating and/or the combustion step.

6. A process according to claim 1 wherein the liquid mixture comprises water.

7. A process for preparing a supported catalyst or catalyst precursor containing carbon, said process comprising:
   a. preparing a mixture of (i) at least one porous catalyst support and (ii) at least one organic compound in a solvent, said mixture comprising 0 to 20 wt % of water based on the total weight of the mixture;
   b. removing the solvent such that the organic compound is deposited in the pores of the catalyst support;
   c. mixing the catalyst support with a solution of at least one metal-containing compound and removing the solvent to form a solid residue or kneading or mechanical mixing the catalyst support with at least one metal-containing compound, wherein said metal is selected from V, Cr, Mn, Fe, Co, Ni, Cu, Mo and W; and
   d. combusting the resultant solid in an oxygen-containing atmosphere to at least partially convert the organic compound to carbon and to form said supported catalyst or catalyst precursor.

8. A process according to claim 1, which further comprises incorporating a metal-containing promoter or modifier, wherein the metal is at least one of Zr, U, Ti, Th, Hf, Ce, La, Y, Mg, Ca, Si, Cs, Rb, Mo, W, Cr, rare earth metals and noble metals.

9. A process according to claim 1 wherein the polar organic compound is an organic amine, amide, urea, an organic carboxylic acid, an alcohol, an amino acid, a heteroaromatic compound or a surfactant.

10. A process according to claim 9 wherein the polar organic compound is urea, a citrate or citric acid.

11. A process according to claim 1 wherein the final catalyst or catalyst precursor support is an oxide, carbide, oxycarbide, zeolite, or boronnitride.

12. A process according to claim 1 where the combustion is carried out for 15 minutes or less.

13. A process according to claim 1 wherein the combustion is carried out in air.

14. A process according to claim 1 where the combustion is carried out at a temperature of from 150 to 1000° C.

15. A process according to claim 1 where the catalyst or catalyst precursor before activation comprises carbon in an amount of up to 8 wt % based on the total weight of the catalyst or catalyst precursor.

16. A process according to claim 1 wherein the catalyst or catalyst precursor is a Fischer-Tropsch synthesis, hydrotreating, hydrocarbon partial oxidation, steam reforming or carbon dioxide reforming catalyst or catalyst precursor.

17. A process for carrying out a Fischer-Tropsch synthesis, hydrotreating, hydrocarbon partial oxidation, steam reforming or carbon dioxide reforming reaction, which comprises catalysing said reaction with a catalyst prepared by a process as defined in claim 15.

18. A Fischer-Tropsch synthesis catalyst or catalyst precursor comprising, on an inert support,
   i) 10 to 40 wt % cobalt, nickel or a mixture thereof;
   ii) 1 to 10 wt % at least one promoter selected from zirconium, uranium, titanium, thorium, hafnium, cerium, lanthanum, yttrium, magnesium, calcium, strontium, cesium, rubidium, molybdenum, tungsten, chromium, manganese, and rare earth elements; and
   iii) carbon in an amount of up to 8 wt %;
   the above percentages being based on the total weight of the supported catalyst.

19. A steam reforming catalyst or catalyst precursor comprising, on an inert support,
   i) 0.1 to 30 wt. % cobalt, nickel or a mixture thereof;
   ii) 0 to 10 wt. % of at least one promoter selected from sodium, potassium, uranium, titanium, thorium, hafnium, cerium, lanthanum, yttrium, magnesium, calcium, strontium, cesium, rubidium, molybdenum, tungsten, chromium, manganese and rare earth elements; and
   iii) carbon in an amount of up to 4 wt. %;
   the above percentages being based on the total weight of the Supported catalyst.

20. A process according to claim 7, which further comprises incorporating a metal-containing promoter or modifier, wherein the metal is at least one of Zr, U, Ti, Th, Hf, Ce, La, Y, Mg, Ca, Si, Cs, Rb, Mo, W, Cr, rare earth metals and noble metals.

21. A process according to claim 7 wherein the organic compound is an organic amine, amide, urea, an organic carboxylic acid, an alcohol, an amino acid, a heteroaromatic compound or a surfactant.

22. A process according to claim 21 wherein the organic compound is urea, a citrate or citric acid.

23. A process according to claim 7 wherein the final catalyst or catalyst precursor support is an oxide, carbide, oxycarbide, zeolite, or boronnitride.

24. A process according to claim 7 where the combustion is carried out for 15 minutes or less.

25. A process according to claim 7 wherein the combustion is carried out in air.

26. A process according to claim 7 where the combustion is carried out at a temperature of from 150 to 1000° C.

27. A process according to claim 7 where the catalyst or catalyst precursor before activation comprises carbon in an amount of up to 8 wt% based on the total weight of the catalyst or catalyst precursor.

28. A process according to claim 7 wherein the catalyst or catalyst precursor is a Fischer-Tropsch synthesis, hydrotreating, hydrocarbon partial oxidation, steam reforming or carbon dioxide reforming catalyst or catalyst precursor.

* * * * *

UNITED STATES PATENT AND TRADEMARK OFFICE
CERTIFICATE OF CORRECTION

| | | |
|---|---|---|
| PATENT NO. | : 7,304,012 B2 | Page 1 of 1 |
| APPLICATION NO. | : 10/519170 | |
| DATED | : December 4, 2007 | |
| INVENTOR(S) | : Malcolm Leslie Hodder Green et al. | |

It is certified that error appears in the above-identified patent and that said Letters Patent is hereby corrected as shown below:

Column 15, line number 62, please change "Go" to --Co--

Signed and Sealed this

Twenty-third Day of September, 2008

JON W. DUDAS
*Director of the United States Patent and Trademark Office*